United States Patent Office.

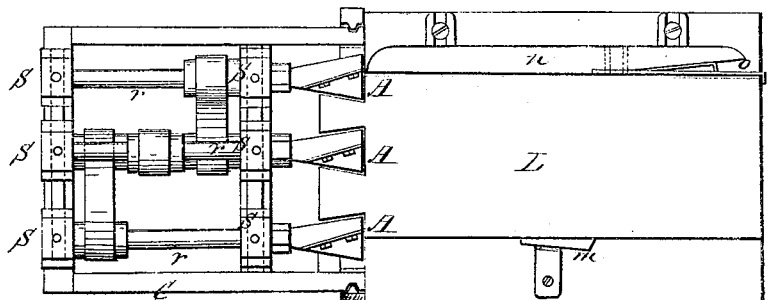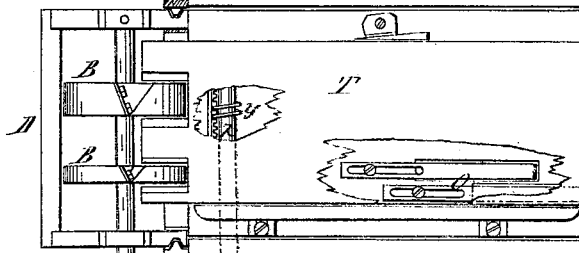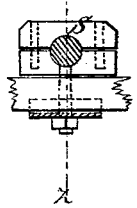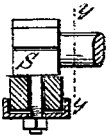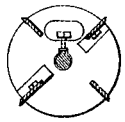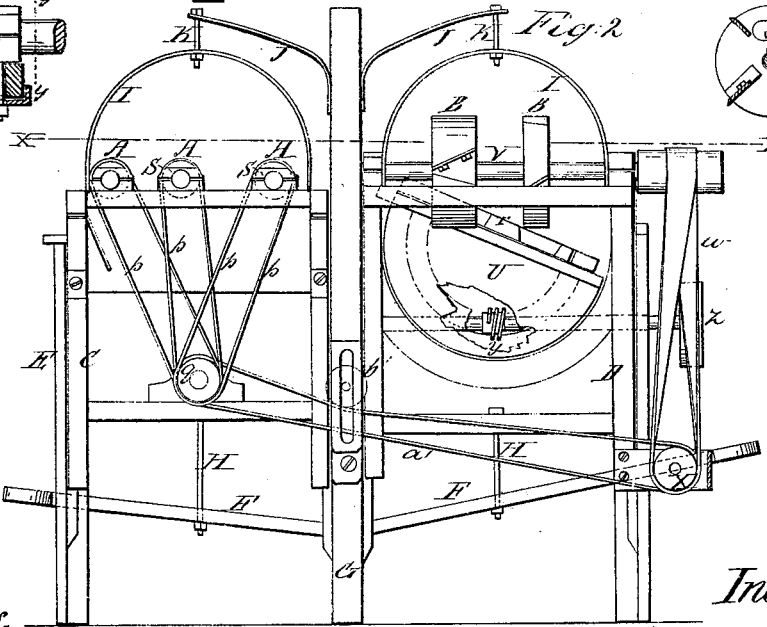

JAMES R. VAN EPPS, OF ALBANY, NEW YORK.

Letters Patent No. 102,069, dated April 19, 1870.

IMPROVEMENT IN DOVETAILING-MACHINE.

The Schedule referred to in these Letters Patent and making part of the same.

*To all whom it may concern:*

Be it known that I, JAMES R. VAN EPPS, of Albany, in the county of Albany and State of New York, have invented a new and useful Improvement in Dovetailing-Machines; and I do hereby declare that the following is a full, clear, and exact description thereof, which will enable others skilled in the art to make and use the same, reference being had to the accompanying drawings forming part of this specification.

This invention relates to new and useful improvements in machines for cutting dovetails for putting together boxes, drawers, flasks for foundries, and for all similar work, and consists in the construction, arrangement, and combination of parts, as hereinafter more fully described.

In the accompanying plate of drawings—

Figure 1 represents a sectional top view of the machine, showing the cutting-cones and cylinders, and the beds for the lumber or pieces to be cut, the section being on the line $x \, x$ of fig. 2.

Figure 2 is a front elevation of the machine, showing the method of operating the cutter.

Figure 3 is a sectional view of one of the cone-cutter shafts, the section being through the line $y \, y$ of fig. 4.

Figure 4 is a section of fig. 3 on the line $z \, z$. The two views show the method of adjusting the cone-cutter shafts laterally on the frame.

Figure 5 represents the method of placing and fastening the cutters in the cylinders, it being a side view of the cylinder.

Similar letters of reference indicate corresponding parts.

A represents the cone-cutters, which cut the mortise-part of the dovetail.

B represents the cylinder-cutters, which cut the tenon-part of the dovetail. The former is cut on the end of the piece, while the piece rests on a fixed or stationary bed in a horizontal position. The latter is cut while the piece of lumber is on an adjustable bed. Each set of cutters is confined in a carriage, which works vertically on the end of the machine-frame, and cut as they descend in each case.

C is the carriage for the cone-cutters A.

D is the carriage of the cylinder-cutters B.

E represents the frame of the machine. The two carriages are confined in ways in the front of the frame.

F represents foot-levers, whose fulcra are, at their inner ends, on the central post G of the frame.

These levers are attached to the lower ends of the carriages by means of the rods H.

I represents semicircular bands attached to the top ends of the carriages, which are connected with the springs J by the rods K. When the cutters have been depressed by pressure on the levers F, they are brought back (or raised) by these springs.

L is the board or piece of lumber, through the end of which the conical cutters A have cut their way, and formed dovetail recesses. This piece is clamped by the wedge $m$ against the adjustable guide-bar $n$.

O represents spring guides on the bar for governing the depth of the dovetail.

The cutters are revolved by means of the belts $p$ on the drum $q$.

The cutter-shafts $r$ are adjustable on the carriage C, as the rails upon which their boxes S rest are slotted longitudinally, and the boxes are fastened in any desired position by means of screws on the under side of the rails. This arrangement is seen in the detail views, figs. 3 and 4.

T represents the piece of lumber on which the cylinder-cutters B have worked.

U is the bed upon which it is fastened. This bed is semicircular in form at its ends, so that it may be turned, and its face inclined in either direction, as seen in fig. 2. In this manner the piece T is tipped until the vertically-descending cylinder-cutter will cut the edges of the tenons on a bevel to fit the dovetail in L.

The cylinder-cutters may be made adjustable on their shaft V by means of a set-screw, as seen in fig. 5.

These cutters are driven by means of the belt W from the pulley X.

The bed U is adjusted or turned by means of the perpetual screw Y on the shaft Z, which screw engages with a circular rack on the inside of the head or end of the bed.

Motion is conveyed from the drum $q$ to the pulley X by means of the belt $a'$. $b'$ is a tightening-pulley bearing on this belt.

It will be seen that, by this machine, the usually tedious and difficult operation of dovetailing two pieces of lumber together, and thus making a perfectly tight and strong joint, is rendered perfectly easy, and may be performed in the most expeditious and perfect manner.

Having thus described my invention,

I claim as new and desire to secure by Letters Patent—

1. The rotating dovetail-cutters A A A, having a lateral adjustment and vertical movement, as set forth, supporting-table provided with clamp wedge $m$, adjustable guide-bar $n$, and the spring guides O to govern depth of dovetail, all constructed and arranged with respect to each other in the manner described.

2. The shafts $r$ and their several pulleys, the belts $p \, p \, p$ and drum $q$, all located on a vertically-reciprocating carriage, C, the belt $a'$, tightening-pulley $b$, and driving-pulley X, all arranged, constructed, and operating in the manner and for the purpose herein shown and described.

3. The arrangement, upon the frame E, of the carriage C D, bands I I, springs J J, treadles F, and beds for the timber, as specified, so that the mortise and tenon may be respectively cut in the manner set forth.

4. The cutters B B, each arranged on the vertically-moving frame D, in combination with the tipping-bed u, all as shown and described.

The above specification of my invention signed by me this 29th day of March, 1869.

JAMES R. VAN EPPS.

Witnesses:
 FRANK BLOCKLEY,
 ALEX. F. ROBERTS.